United States Patent
Xu et al.

(10) Patent No.: US 8,331,110 B2
(45) Date of Patent: Dec. 11, 2012

(54) SWITCHING CAPACITOR—PWM POWER CONVERTER

(75) Inventors: Ming Xu, Blacksburg, VA (US); Ke Jin, Blacksburg, VA (US); Fred C. Lee, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 576 days.

(21) Appl. No.: 12/638,261

(22) Filed: Dec. 15, 2009

(65) Prior Publication Data

US 2011/0140679 A1   Jun. 16, 2011

(51) Int. Cl.
*H02M 3/335* (2006.01)
*G05F 3/04* (2006.01)

(52) U.S. Cl. .............. 363/16; 363/18; 323/235; 323/305

(58) Field of Classification Search .............. 363/15–19, 363/22–26; 323/235, 237, 301, 304, 307–310
See application file for complete search history.

(56) References Cited

U.S. PATENT DOCUMENTS

| 5,844,787 A * | 12/1998 | Fraidlin et al. ............. 363/21.12 |
| 6,188,586 B1 * | 2/2001 | Farrington et al. ............. 363/17 |
| 6,272,023 B1 * | 8/2001 | Wittenbreder ................. 363/16 |
| 7,471,524 B1 * | 12/2008 | Batarseh et al. ................ 363/25 |

* cited by examiner

*Primary Examiner* — Jessica Han
(74) *Attorney, Agent, or Firm* — Whitham, Curtis, Christofferson & Cook, P.C.

(57) ABSTRACT

A power converter topology operates as a switching capacitor (capacitive voltage divider) converter during a first, preferably short portion of a switching cycle to provide excellent dynamic transient response and as a pulse width modulated converter during a second portion of a switching cycle to provide flexibility of voltage regulation and generality of application. This topology can be made self-driven and is capable of zero voltage switching. Therefore the power converter can be used as one of a plurality of branches of a multi-phase converter to enhance transient response. The respective branches can also be independently optimized for particular load levels and can be operated independently in a phase shedding manner to improve efficiency at low load. Further, the power converter or respective branches of a multi-phase power converter are compatible with non-linear control to further improve dynamic response.

20 Claims, 7 Drawing Sheets

SWITCHING CAPACITOR—PWM POWER CONVERTER

FIELD OF THE INVENTION

The present invention generally relates to power supplies and power converters and, more particularly, to power converters particularly suited to distributed power systems and generalized point-of-load (POL) applications.

BACKGROUND OF THE INVENTION

Recent trends in telecommunications equipment and computer systems, in particular, employ an open architecture, modular approach in their design in order to accommodate sharing of resources and system expansion as well as physical distribution over potentially wide areas. This trend has necessitated use of distributed power systems. For example, widespread use of the Internet requires infrastructure support to provide a high-quality and reliable power network that must necessarily be distributed. On a much smaller scale, increased functionality of data processors fabricated at increased integration density is requiring lower voltages and higher currents such that high quality power with accurate voltage regulation often must be provided at the point-of-load (POL); requiring numerous power converters in a single device or even a plurality of power converters for a single chip.

It is therefore foreseeable that future electrical power processing will have virtually all electrical loads interface to energy sources through power electronics circuits or devices. Advanced power processing systems will be expected to achieve fully controllable, fully reconfigurable, autonomous platforms that can be customized for electrical energy supply in such applications as telecommunications, computers, Internet infrastructure, automotive and aerospace applications and the like and will be required to provide on-demand power from respective available sources to loads at any rate and in any desired form.

To support these trends, greater numbers of advanced power processors have been employed in many diverse devices together with customized and miniaturized power POL converters which must also be reduced in size as much as possible. High power density (e.g. Watts per unit volume) and high efficiency are major objectives for power (e.g. DC/DC) converters but success in simultaneously achieving such objectives is often limited by various trade-offs. For example, to increase power density, high switching frequency can increase the control bandwidth so that fewer and/or smaller capacitors are needed to meet transient requirements but such high frequency switching may cause high losses in switching, drivers and body diodes of synchronous rectifiers (SRs). Due to such trade-offs, current approaches to power converter design and known power converter topologies are inadequate to meet foreseeable requirements of power density and efficiency.

SUMMARY OF THE INVENTION

It is therefore an object of the present invention to provide a switching capacitor pulse width modulated (PWM) converter which functions as a combination of a switching capacitor converter and a PWM converter during respective portions of a switching cycle and which can provide zero voltage switching (ZVS), avoid SR drivers, provide good efficiency and dynamic performance, flexibility of application and high power density at low cost.

In order to accomplish these and other objects of the invention, a power converter or a branch of a multi-phase power converter is provided which comprises a transformer having oppositely coupled primary and secondary windings, each of the primary and secondary windings having first and second terminals, an inductor connected in parallel with said secondary winding, a first switch for supplying input power to the first terminal of the primary winding of said transformer, a second switch connected between first terminals of the primary and secondary windings, a third switch for supplying current to the inductor at a node connected to the first terminal of the secondary winding, and a capacitor connected to the second terminal of the primary winding to be in series with the primary winding.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
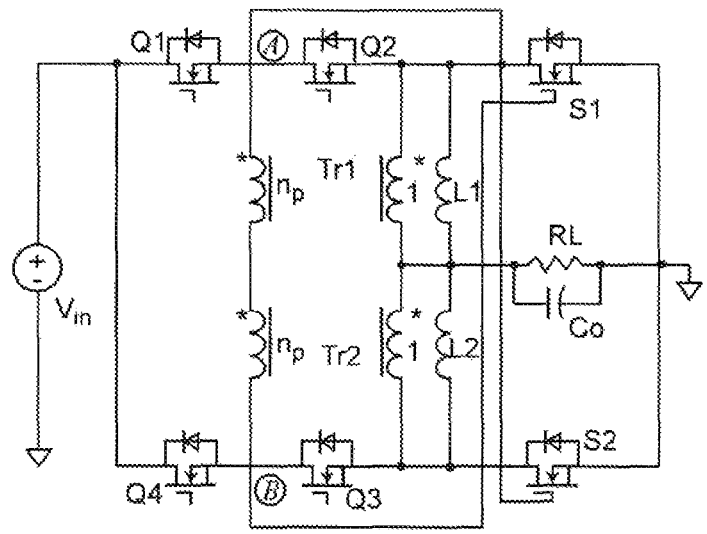
FIG. 1 is a schematic diagram of a known self driven, ZVS, non-isolated full bridge DC/DC converter.
Figure 2:
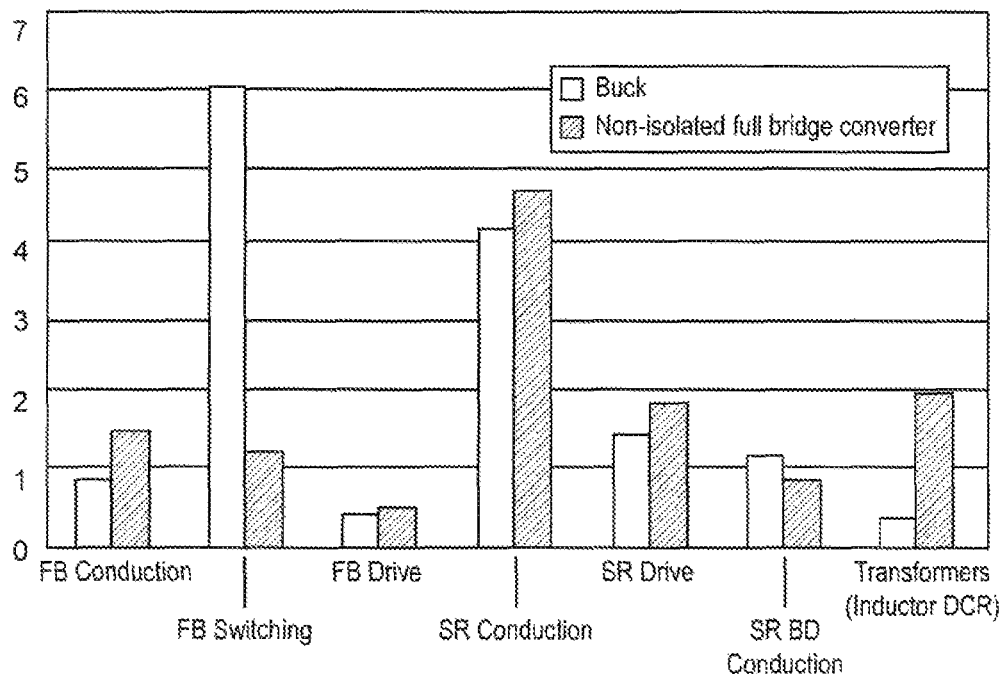
FIG. 2 is a graphical comparison of losses of the circuit of FIG. 1 with a two-phase buck converter.

Referring now to the drawings, and more particularly to FIG. 1, there is shown a schematic switching voltage regulator as disclosed in an article entitled "A self-driven, Soft-switching Voltage Regulator for Future Microprocessors" by Zhou et al., IEEE Transactions on Power Electronics, Volume 20, No. 4, pp. 806-814, July 2005; which article is hereby fully incorporated by reference. This particular voltage converter topology has numerous desirable characteristics in comparison with other known voltage converter topologies. The self driven, non-isolated, full bridge converter of FIG. 1 operates as a two-phase converter, uses interleaved control and has the advantages of ZVS of all MOSFETs, eliminates synchronous rectifier (SR) drivers to save cost, derives reduced body diode conduction from avoidance of a need to adjust SR control timing and reduces turn-off loss and body-diode reverse recovery loss through an extended duty cycle due to use of a step-down transformer. FIG. 2 provides a graphic comparison of different categories of losses in this circuit with those of a two-phase buck converter at the same 1.2V/70 A output and 1 MHz switching frequency. (The losses are depicted as a percentage of input power.) It can be readily appreciated from FIG. 2 that the power converter circuit of FIG. 1 has only slightly greater losses in most categories (less than 1% greater in all but transformer/inductor direct current resistance (DCR) losses) but is significantly more efficient in regard to feedback (FB) switching losses (for voltage control) and about 1% more efficient in regard to synchronous rectifier (SR) body-diode (BD) losses; thus yielding several percent reduction in overall losses as compared with a two-phase buck converter topology. At the present State of the art, reduction of combined losses of all categories by more than 1% is regarded as a highly significant improvement.

However, the topology of the power converter of FIG. 1 has several significant drawbacks that may limit its general applicability. Specifically, the power converter circuit of FIG. 1 operates with interleaved phases that cannot be separated (or "shed" as the load decreases) consistent with being self driven since the voltage at nodes A and B are used to control switches S2 and S1, respectively. Therefore, even under light loads, both phases must operate to contribute to the output power which results in low light-load efficiency. In addition, consistent with being self-driven, non-linear control (which simultaneously turns two or more phases on or off and/or provides or inhibits additional switching pulses simultaneously in one or more phases in addition to normal interleaved operation of respective phases, as will be discussed in greater detail below) cannot be employed to further improve high dynamic performance (e.g. transient response or current slew rate in response to rapidly changing load). Further, for some low power applications such as a 40 W double data rate (DDR) memory point of load (POL), seven devices (one transformer, two inductors and four primary side devices and two synchronous rectifiers and two drivers are unduly complex and not economical compared to other topologies as well as requiring excessive space and reducing power density for low power applications.

The inventors have discovered that these drawbacks can be avoided while retaining the advantages of the circuit of FIG. 1 with a somewhat similar topology that nevertheless operates much differently in accordance with different principles of operation to produce unique and advantageous behaviors. That is, while the two phases of the circuit of FIG. 1 cannot be separated, a single phase power converter having similar features and advantages in regard to efficiency can be formed by placing a capacitor in series with the primary side of the transformer in a circuit corresponding to the circuit of FIG. 1 but divided into two symmetrical halves with the windings of the transformer oppositely coupled, resulting in a circuit topology schematically illustrated in FIG. 3A.

Figure 3A:
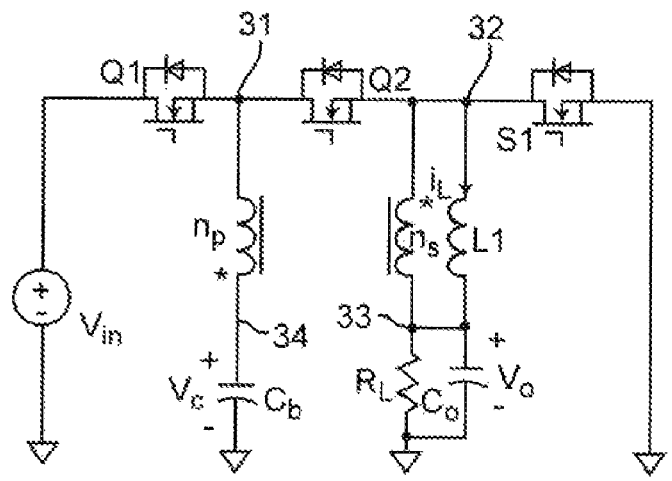
FIG. 3A is a schematic diagram of a preferred form of a power converter circuit in accordance with the invention.

In such a topology in accordance with the invention, the circuit topology of FIG. 3A can be used alone or two or more such circuits can be provided as parallel branches (which can be independently optimized/customized as a given application may dictate) and each branch can operate independently (e.g. with any number of branches being activated or deactivated as in "phase shedding" with diminishing load and any desired phase separation between branches or even in phase as is the case with employment of non-linear controls). Therefore, for low power applications, the complexity, parts count and cost of a power converter in accordance with the invention are approximately halved, low power efficiency can be more than doubled (e.g. by adding or removing branches as required power is increased or reduced) and non-linear controls can be employed in any or all branches or phases.

The resulting circuit as schematically illustrated in FIG. 3A thus comprises a transformer having oppositely coupled primary and secondary windings. The primary and secondary windings each have two terminals with switch Q2 coupled between first terminals (31, 32) of the primary and secondary windings, respectively. An inductor L1 is connected between first and second terminals (32, 33) of the secondary winding and capacitor $C_b$ is connected in series with the primary winding at the second terminal 34 thereof. Input power is supplied through switch Q1 to the first terminal 31 of the primary winding and freewheel current is supplied to the inductor through a synchronous rectifier S1. The load with a parallel-connected filter capacitor $C_o$ is connected in series with the inductor at the node connecting the second terminal 33 of the secondary winding and the inductor.

Figure 3B:
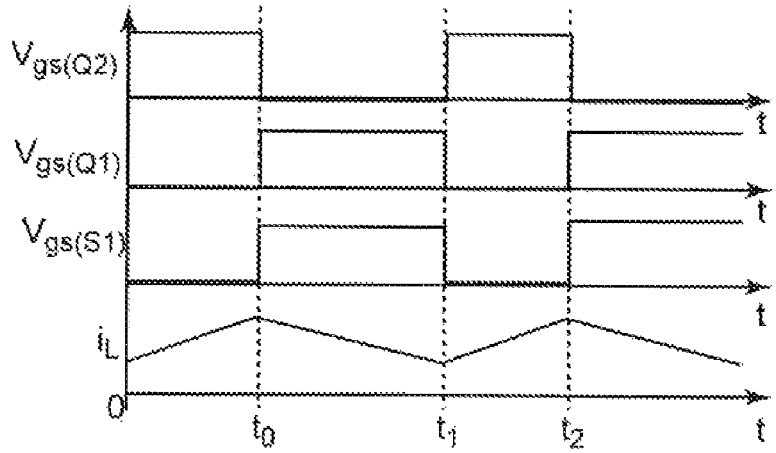
FIG. 3B is a graph of key waveforms useful for understanding the operation of the circuit of FIG. 3A, FIGS. 4A and 4B are simplified equivalent circuits of the circuit of FIG. 3A during respective periods of a switching cycle.
Figure 4A:
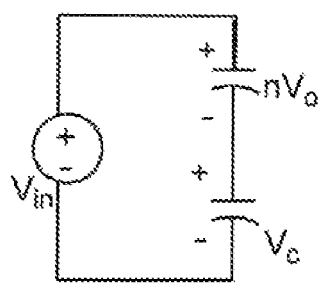

The operation of the circuit of FIG. 3A is quite simple and key waveforms are illustrated in FIG. 3B. During the period from $t_0$ to $t_1$ (hereinafter periods during a switching cycle will be identified using a notation such as $[t_0\text{-}t_1]$), Q1 and S1 are conductive or "on", yielding the simplified equivalent circuit illustrated in FIG. 4A. The output voltage $V_o$ on filter capacitor $C_o$ reflects to the primary side of the transformer as $nV_o$ and is thus in series with $V_c$ (on capacitor $C_b$ and in parallel with $V_{in}$ and therefore behaves as a switching capacitor converter (which operates by periodically creating a capacitive voltage divider and then switching a charged capacitor to a different location in the circuit) having outstanding dynamic performance due to directly charging a capacitive load with minimal (ideally zero) series resistance as is generally recognized by those skilled in the art as indicated in "Voltage Divider and its application in the Two-Stage Power Architecture" by Ming Xu et al., Proc. IEEE APEC, 2006, pp. 499-505 which is hereby fully incorporated by reference. That is, in this configuration, the power converter circuit in accordance with the invention operates as a capacitive voltage divider with a charging time constant determined principally by the low turn-on resistance of Q1 and the increasing current due to charging of capacitors is coupled to the transformer secondary producing a voltage resulting in current $i_L$ in inductor L1 to drive the load and charge capacitor $C_o$. In this configuration, S1 functions similarly to a so-called bottom switch in a buck converter to supply freewheel current to the inductor L1 when Q1 is "off".

Figure 4B:
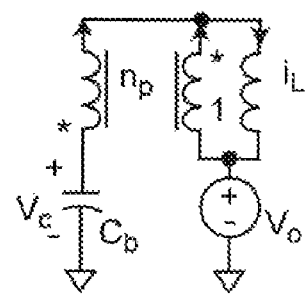

During $[t_1\text{-}t_2]$ ($t_2$ corresponding to $t_0$ in the following switching cycle, denoted as $T_{2/0}$), Q1 and S1 are turned off and Q2 is turned on; yielding the simplified equivalent circuit of FIG. 4B. In this configuration, the transformer is reset, current flows in the transformer primary winding due to discharge of $C_b$ through L1 and the decreasing current causes a voltage in the transformer secondary which also contributes to the current through L1. Thus, in this configuration, L1 functions in much the same manner as an inductor in a buck converter topology. The output voltage is regulated by the duty cycle of Q2; thus performing as a pulse width modulated (PWM) converter.

These two periods of operation where the power converter in accordance with the invention alternately operates as a switched capacitor converter and as a PWM converter are repeated with period $[t_0\text{-}t_1]$ preferably being constant and relatively short and $[t_1\text{-}t_{2/0}]$ preferably being variable, depending on the input voltage and required output voltage. The resulting performance combines the good dynamic response of a switched capacitor converter (allowing $C_b$ and $C_o$ to be relatively small if the switching frequency is comparable to the required output current slew rate) with the flexible and adjustable voltage regulation of a PWM converter.

Compared with the power converter circuit of FIG. 1, the power converter in accordance with the invention is much more flexible in that it comprises an independent converter corresponding to only one of the two inseparable phases (but with the transformer coupling reversed) of the power converter of FIG. 1 and requires only slightly more than one-half the number of components since only the series capacitor $C_b$ need be added. Moreover, any desired number of branches can be added, preferably of different phases (which also improves dynamic transient response) and which may each be optimized to deliver a particular level of current matched to different current levels required by the load in order to greatly improve low load efficiency simply by, for example, termination of switching control to one or more branches when the load current contribution thereof is not required, sometimes referred to herein as "phase shedding". Further, while the circuit as shown in FIG. 3A does not inherently provide ZVS and is not inherently self driven, those qualities can be easily developed by simple and straightforward modifications.

Figure 5:
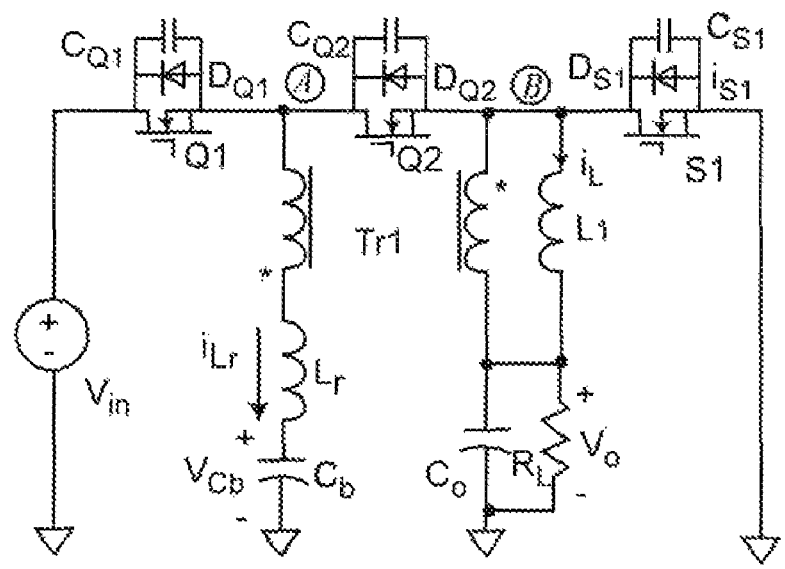
FIG. 5 is a schematic diagram of the circuit of FIG. 3A including an inductor to achieve ZVS.
Figure 6:
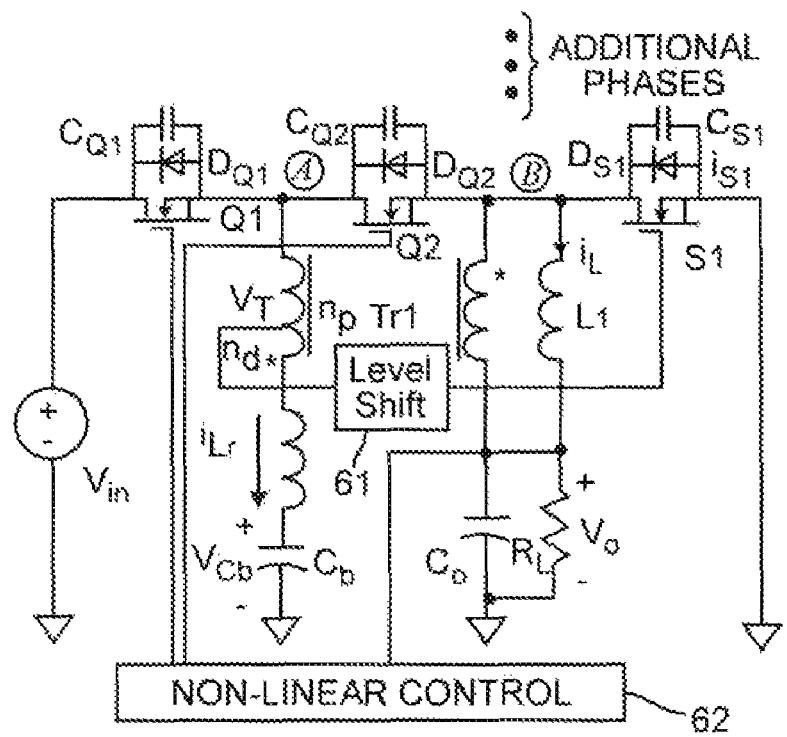
FIG. 6 is a schematic diagram of a self driven implementation of the circuit of FIG. 3A.

For example, as shown in FIG. 5 the use of a transformer implies a leakage inductance, Lr, shown in series with the transformer primary winding and collectively representing equivalent circuit locations. By choice of value of capacitor $C_b$ and/or switching cycle frequency, the leakage inductor will (or can be made to) resonate with capacitor $C_b$ so that the switches can realize ZVS to reduce electrical stresses and losses therein.

In order to reduce drive loss and body diode conduction loss of the synchronous rectifier S1, the circuit of FIG. 3A can be self driven from the voltage at node A. However, it is preferred to provide self driving using a tapped primary winding or an autotransformer as a portion of transformer Tr1 as a level shifter 61 (or a level shifter 61 additionally provided) in order to obtain a desired SR drive voltage.

Figure 7A:
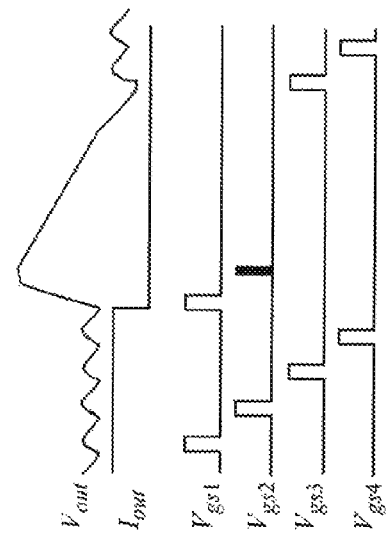
FIGS. 7A, 7B, 7C and 7D illustrates application of non-linear controls in a multi-phase power converter in accordance with a perfecting feature of the invention.
Figure 7B:
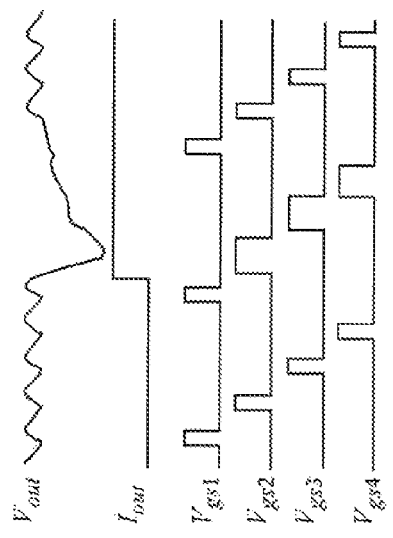

Since two inseparable phases are not required, so called non-linear control 62, alluded to above, may also be employed. In general, changes in load which may cause a fluctuation or change in output voltage are compensated by sensing the voltage error and altering the pulse width (or, for some applications, frequency, or both) to supply additional current and correct the output voltage as may be required for a given load device. In such a case, pulse width and/or frequency are adjusted in a more-or-less linear manner as illustrated in FIGS. 7A and 7B for increasing and decreasing power transient conditions, respectively, generally through a feedback arrangement. It should be noted from FIGS. 7A and 7B that pulse width changes are applied only to pulses following the load transient and at the normal timing of pulses of respective phases and that the pulse width changes in accordance with the error in the output voltage. It should also be appreciated that multi-phase power converters have better dynamic response than single phase power converters due to the arbitrary timing of the transient and the next switching pulse that can be modified to provide compensation. That is, in FIGS. 7A and 7B the load transient is depicted as occurring shortly after the termination of the switching pulse $V_{gs1}$ and, since switching of other phases occurs shortly thereafter, compensation can be completed in (in this case) only slightly longer than one switching cycle with substantial compensation being provided by the immediately following pulses $V_{gs2}$-$V_{gs4}$.

Figure 7C:
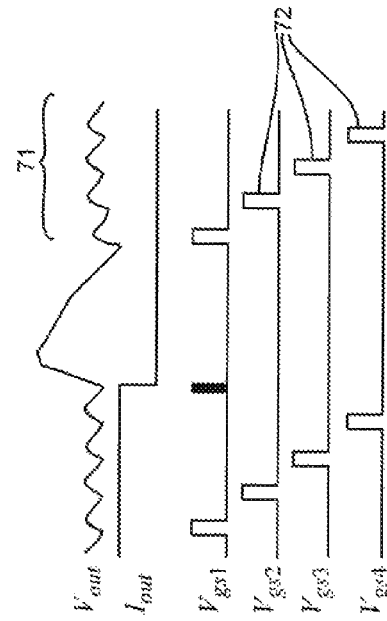
Figure 7D:
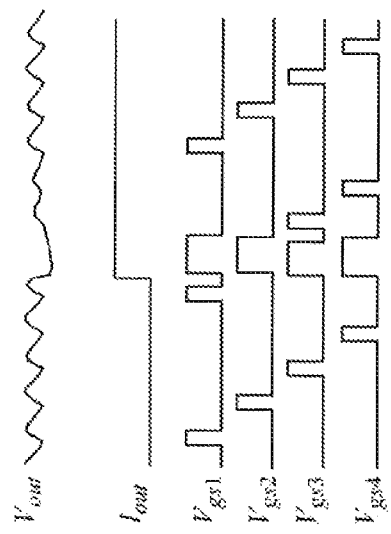

However, dynamic response is limited by the requirement for the output voltage to fluctuate sufficiently to be sensed, the signal propagation time of the feedback circuit and, importantly, the response time of the switching control circuit. Non-linear controls, as illustrated in FIGS. 7C and 7D for increasing and decreasing load transients, respectively, provide for additional switching pulses to be provided in one or more and often all available phases or suppression when an increasing load transient is detected (to inject additional current) or suppression of normal interleaved pulses when a decreasing load transient is detected (to temporarily interrupt supply of current until excess current is consumed and voltage returned to the desired level). By comparison of FIGS. 7A and 7C, it can be seen that voltage fluctuation upon an increasing load transient can be reduced to substantially the level of the ripple current almost instantaneously. As will be seen, from a comparison of FIGS. 7B and 7D, for decreasing load transients, the voltage fluctuation is reduced in both magnitude and duration since switching pulses can be suppressed much more quickly than pulse width modulation (or frequency change) can be performed. That is, in FIG. 7D, the first switching pulse, $V_{gs2}$, following the load transient is completely suppressed whereas, in FIG. 7B, the pulse is merely pulse width modulated and thus contributes to the magnitude of the voltage fluctuation and the duration of the period required for the desired output voltage to be resumed.

It should also be noted from FIG. 7D that there is a slight rise in output voltage after the correction for the decreasing load transient which would be normally corrected after a somewhat increased period of time (since the error is relatively small) by reduction of pulse width to match the required load current. However, as alluded to above, particularly short pulse width reduces power converter efficiency at low load and the loss of efficiency can be quite substantial. Such a loss of efficiency can be observed at 81 in FIG. 8C discussed in greater detail below.

Alternatively, load on one or more branches can be maintained at a level where such loss of efficiency is avoided (and a pulse width providing near optimal efficiency maintained by suppressing pulses 72 (e.g. $V_{gs2}$, $V_{gs3}$ and/or $V_{gs4}$) on one or more branches of a multi-phase power converter; thus increasing the load on other branches to a level providing acceptable efficiency. Such a technique is an illustration of phase shedding alluded to above.

Therefore, use of non-linear controls and/or phase shedding, which can be implemented in numerous ways not important to the successful practice of the invention, are powerful techniques for improving dynamic response and efficiency, respectively, of a power converter and a severe shortcoming of power converter topologies that preclude their use, such as in the circuit of FIG. 1, discussed above. Conversely, compatibility with non-linear controls and phase shedding achieved in accordance with the invention while retaining virtually all other desirable behaviors of the circuit of FIG. 1 is an extremely important and counter-intuitive meritorious effect of the present invention which is achieved by providing a power converter that, in its basic form, operates as a single, independent circuit but which can be used as a branch of a multi-phase power converter which is completely independent of the operation of any of the other branches and which branches can be individually optimized for particular increments of load that may be characteristic of a powered device (e.g. so-called sleep, stand-by and full processing speed modes of a processor).

Figure 8A:
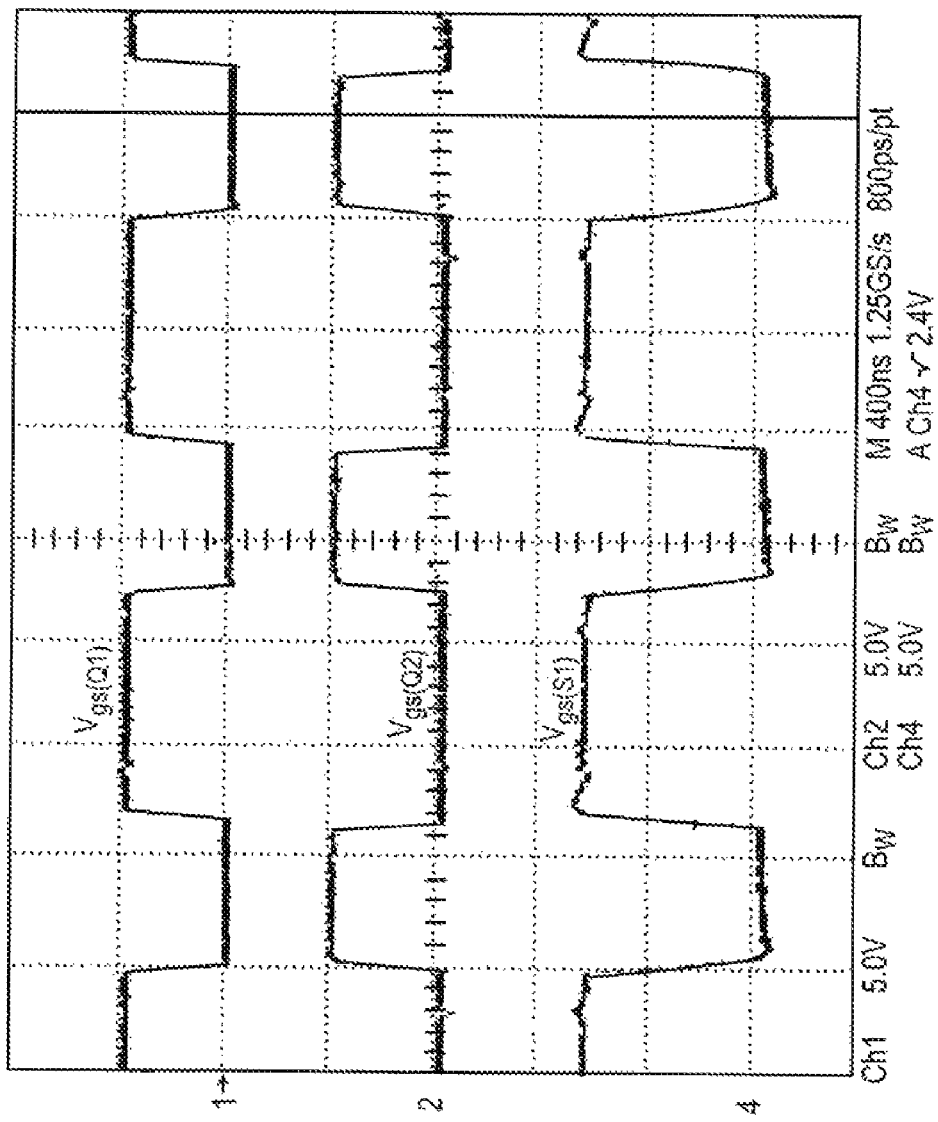
FIGS. 8A-8C illustrate experimental results obtained from a prototype power converter in accordance with the invention.
Figure 8B:
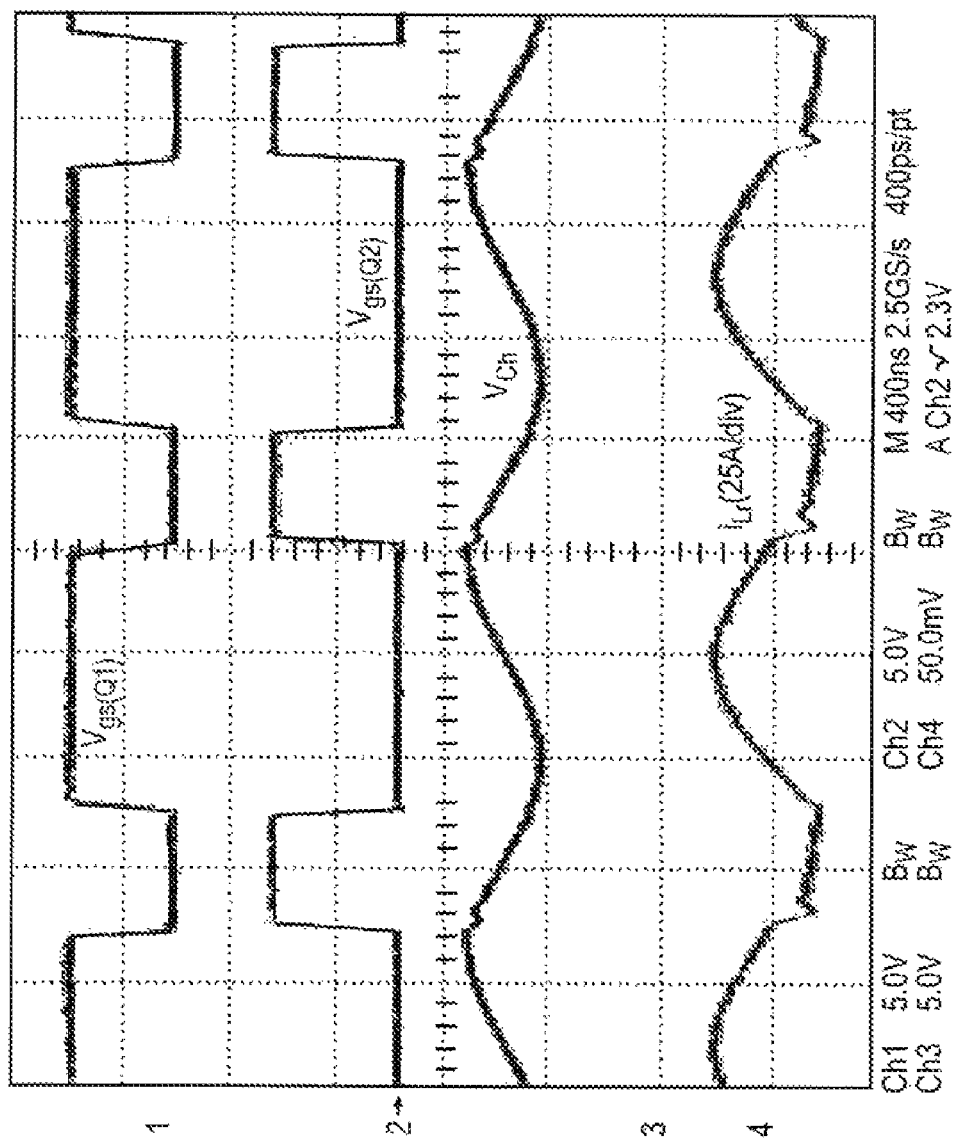
Figure 8C:
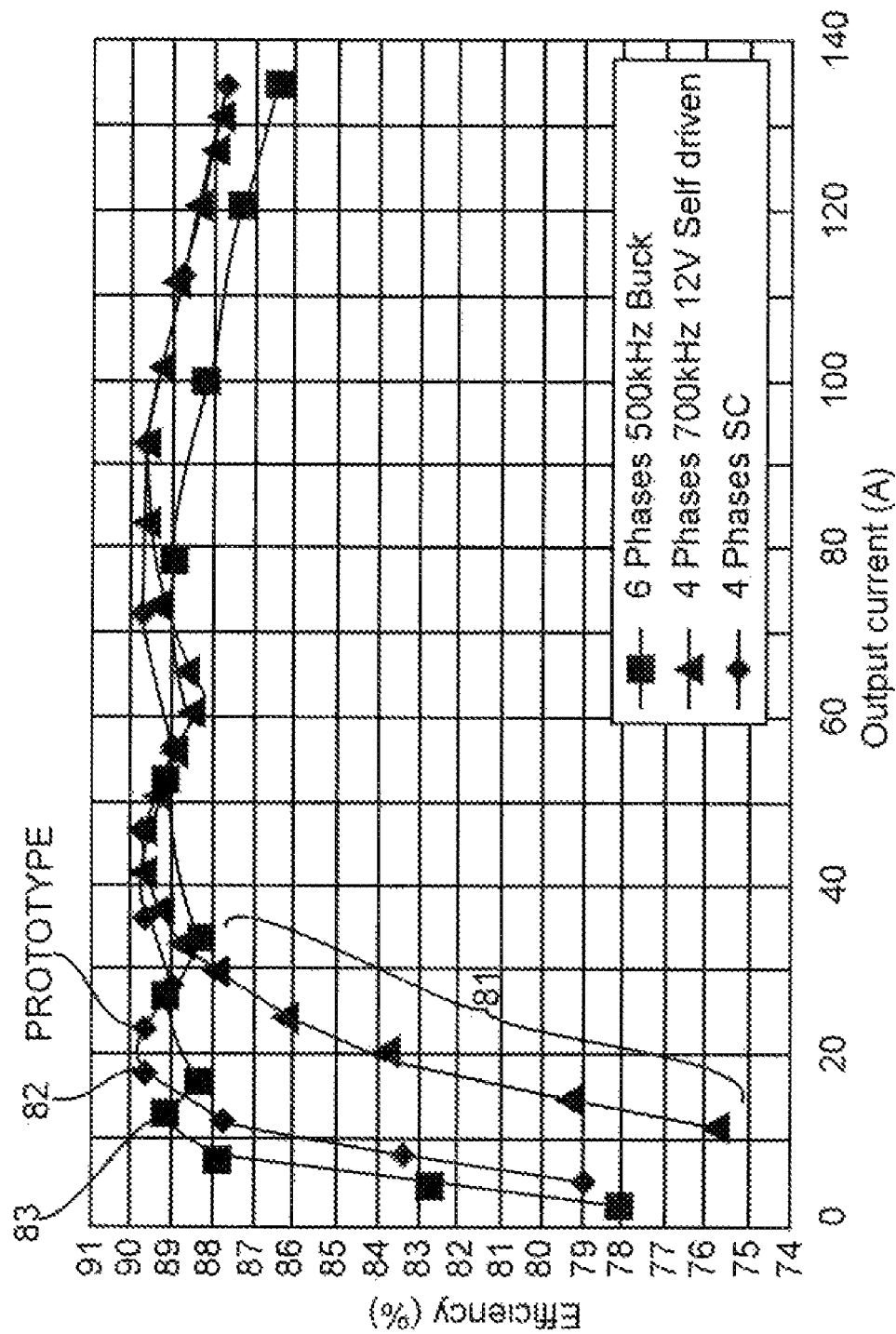

A four-phase 700 kHz 1.2V/130 A output voltage regulator module prototype has been built to verify the above analysis. FIGS. 8A-8C shows the test waveforms and comparative efficiency of the prototype to other power converter topologies having the same power delivery capacity. Specifically, FIG. 8A shows the waveforms of $V_{GS(Q1)}$, $V_{GS(Q2)}$ and corresponding $V_{GS(S1)}$. FIG. 8B shows the same waveforms for Q1 and Q2 and the corresponding blocking capacitor voltage $V_{cb}$ and transformer primary-side current $I_{lr}$ confirming operation as described above. FIG. 8C illustrates an efficiency comparison between a six phase buck converter, a 12V four-phase self-driven converter and the prototype four-phase converter with phase-shedding in accordance with the invention. It is evident from FIG. 8C that the converter in accordance with the invention provides comparable or improved efficiency than the six-phase buck converter but does so with fewer and less expensive components while providing much improved efficiency over a four-phase self-driven converter, particularly at low current load. By the same token, phase shedding will generally allow greater efficiency to be maintained at light load as can be seen from a comparison of peaks 82 and 83. Outstanding dynamic response can be achieved since non-linear controls may be employed, as described above, which may supplement the exceptional dynamic response of the invention as noted above in connection with FIG. 4A.

In view of the foregoing, it is readily seen that the invention provides a new power converter topology that provides not only improved efficiency over more traditional power converter topologies such as buck converters, but also provides greater flexibility of application for topologies such as that of FIG. 1 which also provide improved efficiency over other traditional power converter topologies while retaining other advantages and overcoming the drawbacks thereof. Simple modifications or optimization for particular applications allows the power converter topology of the invention to achieve low load efficiency, ZVS and self driving in virtually any application and POL power supplies in distributed power systems in particular. Further, by using similar topologies which exhibit similar properties and behaviors, anomalous interactions between power converters of diverse designs are usually avoided.

While the invention has been described in terms of a single preferred embodiment, those skilled in the art will recognize that the invention can be practiced with modification within the spirit and scope of the appended claims.

We claim:

1. A power converter comprising
    a transformer having oppositely coupled primary and secondary windings, each of said primary and secondary windings having first and second terminals,
    an inductor connected in parallel with said secondary winding,
    a first switch for supplying input power to said first terminal of said primary winding of said transformer,
    a second switch connected between first terminals of said primary and secondary windings,
    a third switch for supplying current to said inductor at a node connected to said first terminal of said secondary winding, and
    a capacitor, connected to said second terminal of said primary winding to be in series with said primary winding.

2. The power converter as recited in claim 1, wherein leakage inductance of said transformer resonates with said capacitor connected to said second terminal of said primary winding to be in series with said primary winding.

3. The power converter as recited in claim 1, further including an inductor which resonates with said capacitor connected to said second terminal of said primary winding to be in series with said primary winding.

4. The power converter as recited in claim 1, wherein leakage inductance of said transformer and a further inductor resonate with said capacitor connected to said second terminal of said primary winding to be in series with said primary winding.

5. The power converter as recited in claim 4, wherein said third switch is controlled in accordance with a voltage at a node between said first and second transistors.

6. The power converter as recited in claim 1 wherein said primary winding includes a tap and said third switch is controlled from a voltage at said tap.

7. The power converter as recited in claim 6, further including a level shifter to provide a desired voltage to said third switch.

8. The power converter as recited in claim 1 wherein said primary winding includes an autotransformer and said third switch is controlled from a voltage developed by said autotransformer.

9. The power converter as recited in claim 8, further including a level shifter to provide a desired voltage to said third switch.

10. The power converter as recited in claim 1, further comprising non-linear controls.

11. A multi-phase power converter comprising a plurality of branches wherein each branch comprises
    a transformer having oppositely coupled primary and secondary windings, each of said primary and secondary windings having first and second terminals,
    an inductor connected in parallel with said secondary winding,
    a first switch for supplying input power to said first terminal of said primary winding of said transformer,
    a second switch connected between first terminals of said primary and secondary windings,
    a third switch for supplying current to said inductor at a node connected to said first terminal of said secondary winding, and
    a capacitor connected to said second terminal of said primary winding to be in series with said primary winding.

12. The power converter as recited in claim 11, wherein leakage inductance of said transformer resonates with said capacitor connected to said second terminal of said primary winding to be in series with said primary winding.

13. The power converter as recited in claim 11, further including an inductor which resonates with said capacitor connected to said second terminal of said primary winding to be in series with said primary winding.

14. The power converter as recited in claim 11, wherein leakage inductance of said transformer and a further inductor resonate with said capacitor connected to said second terminal of said primary winding to be in series with said primary winding.

15. The power converter as recited in claim 14, wherein said third switch is controlled in accordance with a voltage at a node between said first and second transistors.

16. The power converter as recited in claim 11 wherein said primary winding includes a tap and said third switch is controlled from a voltage at said tap.

17. The power converter as recited in claim 16, further including a level shifter to provide a desired voltage to said third switch.

18. The power converter as recited in claim 11 wherein said primary winding includes an autotransformer and said third switch is controlled from a voltage developed by said autotransformer.

19. The power converter as recited in claim 18, further including a level shifter to provide a desired voltage to said third switch.

20. The power converter as recited in claim 11, further comprising non-linear controls.

* * * * *